(12) United States Patent
Stahovich et al.

(10) Patent No.: US 10,269,258 B2
(45) Date of Patent: Apr. 23, 2019

(54) SYSTEM FOR AUTOMATIC ASSESSMENT OF STUDENT LEARNING

(71) Applicant: The Regents of the University of California, Oakland, CA (US)

(72) Inventors: Thomas Stahovich, Riverside, CA (US); Timothy Van Arsdale, Riverside, CA (US); Hanlung Lin, Riverside, CA (US); James Thomas Herold, Riverside, CA (US); Kevin Rawson, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 688 days.

(21) Appl. No.: 14/280,345

(22) Filed: May 16, 2014

(65) Prior Publication Data
US 2015/0064681 A1    Mar. 5, 2015

Related U.S. Application Data

(60) Provisional application No. 61/824,304, filed on May 16, 2013.

(51) Int. Cl.
*G09B 5/00* (2006.01)
*G06K 9/00* (2006.01)
*G06K 9/03* (2006.01)

(52) U.S. Cl.
CPC ........... *G09B 5/00* (2013.01); *G06K 9/00416* (2013.01); *G06K 9/00422* (2013.01); *G06K 9/036* (2013.01)

(58) Field of Classification Search
CPC ....................................................... G09B 5/00

USPC ......................................................... 434/350
See application file for complete search history.

(56) References Cited

U.S. PATENT DOCUMENTS

| 2010/0074527 A1* | 3/2010 | Vukosavljevic | G06F 17/215 |
| | | | 382/187 |
| 2014/0045162 A1* | 2/2014 | Ando | G09B 5/00 |
| | | | 434/322 |

OTHER PUBLICATIONS

Kinnebrew, J. and Biswas, G. Identifying Learning Behaviors by Contextualizing Differential Sequence Mining with Action Features and Performance Evolution. In Proceedings of the Fifth International Conference on Educational Data Mining, 2012.
Han-lung Lin, Thomas Stahovich, and James Herold. Automatic Handwritten Statics Solution Classification and Its Applications in Predicting Student Performance. In Proceedings of the 2012 American Society for Engineering Education Annual Confe5rence, 2012.
Richard E. Mayer. Cognitive, metacognitive, and motivational aspects of problem solving. Instructional Science, 26(1-2):49-63, 1998.

(Continued)

*Primary Examiner* — Robert P Bullington
(74) *Attorney, Agent, or Firm* — Brooks Kushman P.C.

(57) ABSTRACT

A system for using a smartpen as a tool for automatically assessing student learning that is simple and accurate. The system has a computer with at least one processor, a memory, a storage, and communications through a protocol, one or more than one smartpen in communication with the computer and a plurality of software modules having non-transitory instructions executable on the processor for at least a characterization module, for characterizing spatial and temporal organization of a student's work, and a machine learning module utilizing the spatial and temporal organization to assess student learning.

16 Claims, 8 Drawing Sheets

(56) References Cited

OTHER PUBLICATIONS

Nicolai Meinshausen. Relaxed Lasso. Computational Statistics & Data Analysis, Elsevier, 52(1):374-393 Sep. 2007.
Scott Miller, Michael Crystal, Heidi Fox, Lance Ramshaw, Richard Schwartz, Rebecca Stone, Ralph Weischedel, and The Annotation Group BBN Technologies. BBN: Description of the Sift system as used for MUC-7. In Proceedings of the Seventh Message Understanding Conference (MUC-7), 1998.
Behrouz Minaei-Bidgoli, Deborah A. Kashy, Gerd Kortemeyer, and Williaim F. Punch, Predicting Student Performance: An Application of Data Mining Methods with the Educational Web-Based System LON-CAPA. In Proceedings of 33rd ASEE/ISEE Frontiers in Education Conference, Boulder, CO, USA, 2003.
Marisa Orr, Lisa Benson, Matthew Ohland, and Sherrill Biggers. Student Study Habits and Their Effectiveness in an Integrated Statics and Dynamics Class. In Proceedings of the 2008 American Society for Engineering Education Annual Conference and Exposition, 2008.
Sharon Oviatt, Alex Arthur, and Julia Cohen. Quiet Interfaces that help students think. In Proceedings of the 19th annual ACM symposium on user interface software and technology (UIST '06), 191-200, New York, NY, USA, 2006.
Patel, R.; Plimmer, B.; Grundy, J.; and Ihaka, R. 2007. Ink features for diagram recognition. In Proc. of SBIM.
Eric Peterson, Thomas Stahovich, Eric Doi, Christine Alvarado, Grouping Strokes into Shapes in Hand-Drawn Diagrams Proc. of the 24th AAAI Conference on Artificial Intelligence (AAAI-10), 2010, pp. 974-979.
Pezdek, K., Berry, T., and Renno, P. A. Children's mathematics achievement: The role of parents' perceptions and their involvement in homework. Journal of Educational Psychology, 94, 771-777, 2002.
P. Radchenko and G. M. James. Improved variable selection with forward-lasso adaptive shrinkage. The Annals of Applied Statistics 5(1):427-448, 2011.
Antti Rasila, Linda Havola, Helle Majander, and Pekka Alestalo. Automatic assessment in engineering mathematics: evaluation of the impact. In Myller, E. (ed.), ReflekTori 2010 Symposium of Engineering Education, 37-45. Aalto University School of Science and Technology, 2010.
Cristóbal Romero and Sebastián Ventura. Educational data mining: A Review of the State of the Art. IEEE Transactions on Systems, Man, and Cybernetics—Part C: Applications and Reviews, 40(6):601-618, 2010.
Romero, C., Romero, J., Luna, J., and Ventura S. Mining Rare Association Rules from e-Learning Data. In Proceedings of the Third International Conference on Educational Data Mining, 2010.
Hiroto Saigo, Jean-Philippe Vert, Nobuhisa Ueda, and Tatsuya Akutsu. Protein homology detection using string alignment kernels. Bioinformatics, 20:1682-1689, Jul. 2004.
Singh, K., Granville, M., and Dika, S. Mathematics and science achievement: Effects of motivation, interest, and academic engagement. Journal of Educational Research, 95, 323-332, 2002.
Stephen Soderland, Brendan Roof, Bo Qin, Mausam Shi Xu, and Oren Etzioni. Adapting open information extraction to domain-specific relations. AI Magazine, 31:93-102, 2010.
Paul S. Steif and John A. Dantzler. A statics concept inventory : development and psychometric analysis. Journal of Engineering Education, Oct. 2005.
Paul Steif and Anna Dollár. Study of Usage Patterns and Learning Gains in a Web-based Interactive Static Course. Journal of Engineering Education, 94(4):321-333, 2009.
Paul Steif, Jamie Lobue, Anne Fay, and Levent Kara. Improving Problem Solving Performance by Inducing Talk about Salient Problem Features. Journal of Engineering Education, 99(2):135-142, 2010.
Andreas Stolcke. SRILM—an extensible language modeling toolkit. In Proceedings of ICSLP, vol. 2, pp. 901-904, Denver, USA, 2002.
Robert Tibshirani. Regression shrinkage and selection via the lasso. Journal of the Royal Statistical Society. Series B (Methodological), 58(1), 267-288, 1996.
Timothy S. Van Arsdale and Thomas Stahovich, Does Neatness Count? What the Organization of Student Work Says About Understanding. In Proceedings of the 119th ASEE Annual Conference and Exposition, San Antonio, TX, 2012.
C. S. Wallace and D. L. Dowe. Minimum Message Length and Kolmogorov Complexity. Computer Journal, 42(4):270-283, 1999.
S. Wang, B. Nan, S. Rosset, J. Zhu. Random lasso. The Annals of Applied Statistics, 5(1):468-485, 2011.
Wang, X.; Biswas, M.; and Raghupathy, S. 2007. Addressing class distribution issues of the drawing vs. writing classification in an ink stroke sequence. In Proc. of SBIM.
Amali Weerasinghe and Antonija Mitrovic. Supporting self-explanation in an open-ended domain. In Mircea Negoita, Robert Howlett, and Lakhmi Jain, editors, Knowledge-Based Intelligent Information and Engineering Systems, vol. 3213 of Lecture Notes in Computer Science, pp. 306-313. Springer Berlin, 2004.
Jacob O. Wobbrock, Andrew D. Wilson, and Yang Li. Gestures without libraries, toolkits or training: a $1 recognizer for user interface prototypes. In Proceedings of the 20th annual ACM symposium on User interface software and technology, UIST '07, pp. 159-168, New York, NY, USA, 2007. ACM.
H. Zou and T. Hastie. Regularization and variable selection via the elastic net. Journal of the Royal Statistical Society: Series B (Statistical Methodology), 67:301-320, Apr. 2005.
Appendix A1 from U.S. Appl. No. 61/824,304, filed May 16, 2013,, which has been incorporated by reference in subject application.
Appendix A2 from U.S. Appl. No. 61/824,304, filed May 16, 2013,, which has been incorporated by reference in subject application.
Appendix A3 from U.S. Appl. No. 61/824,304, filed May 16, 2013,, which has been incorporated by reference in subject application.
Appendix A4 from U.S. Appl. No. 61/824,304, filed May 16, 2013,, which has been incorporated by reference in subject application.
Appendix A5 from U.S. Appl. No. 61/824,304, filed May 16, 2013,, which has been incorporated by reference in subject application.
Appendix A6 from U.S. Appl. No. 61/824,304, filed May 16, 2013,, which has been incorporated by reference in subject application.
Appendix A7 from U.S. Appl. No. 61/824,304, filed May 16, 2013,, which has been incorporated by reference in subject application.
Akaike, H. A New Look at the Statistical Model Identification. IEEE Transactions on Automatic Control, 19, 1974.
Patricia A. Alexander and Judith E. Judy, The Interaction of Domain-Specific and Strategic Knowledge in Academic Performance. Review of Educational Research, vol. 58, No. 4, 375-404, 1988.
Antonek, J. L. Interactive homework: Linking Parents to the Foreign Language Learning of Their Children. Dissertation Abstracts International, 57, 5084, 1996.
Bhat, A., and Hammond, T. 2009. Using entropy to identify shape and text in hand-drawn diagrams. In IJCAI.
Katerine Bielaczyc, Peter L. Pirolli, and Ann L. Brown. Training in self-explanation and self-regulation strategies: Investigating the effects of knowledge acquisition activities on problem solving. Cognition and Instruction, 1995.
Bishop, C. M.; Svensen, M.; and Hinton, G. E. 2004. Distinguishing text from graphics in on-line handwritten ink. In Proc. of the Int. Workshop on FHR, 142-147.
Paul Blanc. Solving a Non-routine Problem: What Helps, What Hinders? In Proceedings of the British Society for Research into Learning Mathematics, 19(2):1-6, 1999.
Bowen, N. K., and Bowen, G. L. The mediating role of educational meaning in the relationship between home academic culture and academic performance. Family Relations, 47, 45-51, 1998.
A.L. Brown and J.D. Day. Macrorules for summarizing texts: The development of expertise. Journal of Verbal Learning and Verbal Behavior, 22:1-14, 1983.
Peter F. Brown, Peter V. deSouza, Robert L. Mercer, Vincent J. Della Pietra, and Jenifer C. Lai. Class-based n-gram models of natural language. Comput. Linguist., 18:467-479, Dec. 1992.
John Chen, Dexter Whittinghill, and Jennifer Kadlowec. Classes that click: Fast, rich feedback to enhance student learning and satisfaction. Journal of Engineering Education, 99(2):159-168, 2010.

(56) References Cited

OTHER PUBLICATIONS

Michelene T. H. Chi; Miriam Bassok; Matthew W. Lewis; Peter Reimann; Robert Glaser. Self-explanations: How students study and use examples in learning to solve problems. In Cognitive Science, pp. 145-182, 1989.

Michelene, T. H. Chi; Nicholas; De Leeuw' Mei hung Chiu, and Christian Lavancher. Eliciting self-explanations improves understanding. Cognitive Science, 18:439-477, 1994.

Cooper, H., Robinson, J., and Erika, P. Does Homework Improve Academic Achievement? A Synthesis of Research, 1987-2003. Review of Educational Research, 76, 1-62, 2006.

Aron Culotta. Integrating probabilistic extraction models and data mining to discover relations and patterns in text. In in Proceedings of the HLT-NAACL-2006, pp. 296-303, 2006.

Dempster, A., Laird, N., and Rubin D. Maximum Likelihood from Incomplete Data via the EM Algorithm. Journal of the Royal Statistical Society, 39, 1-38, 1977.

Deslandes, R., Royer, E., Potvin, P., and Leclerc, D. Patterns of home and school partnership for general and special education students at the secondary level. Exceptional Children, 65, 496-506, 1999.

P. Deutsch and J. L. Gailly. ZLIB Compressed Data Format Specification version 3.3. RFC Editor, 1996.

P. Deutsch. DEFLATE Compressed Data Format Specification version 1.3. RFC 1951, Aladdin Enterprises, May 1996.

Oren Etzioni, Michele Banko, Stephen Soderland, and Daniel S. Weld. Open information extraction from the web. Commun. ACM, 51:68-74, Dec. 2008.

Gennari, L.; Kara, L. B.; and Stahovich, T. F. 2005. Combining geometry and domain knowledge to interpret handdrawn diagrams.

Hall, M., Frank, E., Holmes, G., Pfahringer, B., Reutemann, P., and Witten, I. The WEKA Data Mining Software: An Update. SIGKDD Explorations, 11, 2009.

Rogers Hall. Video Recording as Theory. In D. Lesh and A. Kelly (Eds.) Handbook of Research Design in Mathematics and Science Education, 647-664. Mahweh, NJ: Lawrence Erlbaum, 2000. (A 29).

Simin Hall and Eric A. Vance. Improving self-efficacy in statistics: Role of self-explanation and feedback. Journal of Statistics Education, 2010.

Trevor Hastie, Robert Tibshirani, and Jerome Friedman. The Elements of Statistical Learning: Data Mining, Inference, and Prediction. New York, NY: Springer, 2009.

Herold, J. and Stahovich, T. Characterizing Students' Handwritten Self-Explanations. In Proceedings of American Society for Engineering Education Annual Conference & Exposition, 2012.

David Hestnes, Malcom Wells, and Gregg Swackhamer, Force Concept Inventory. The Physics Teacher, vol. 30, Issue 3, 141-158, Mar. 1992.

Jerry R. Hobbs, Mabry Tyson, John Bear, and David Israel. Sri international: Description of the fastus system used for muc-4. In in Proceedings of the Fourth Message Understanding Conference (MUC-4, pp. 268-275. Morgan Kaufmann, 1992.

Levent Burak Kara, Thomas F. Stahovich, An Image-Based, Trainable Symbol Recognizer for Hand-drawn Sketches Computers & Graphics 29(4): 501-517 2005.

\* cited by examiner

SYSTEM FOR AUTOMATIC ASSESSMENT OF STUDENT LEARNING

CROSS-REFERENCE TO RELATED APPLICATIONS

This application claims the benefit under 35 U.S.C. § 119(e) of U.S. Provisional Patent Application Ser. No. 61/824,304, filed on May 16, 2013, the contents of which are incorporated herein by reference in their entirety.

FIELD OF THE INVENTION

The present invention relates to assessment systems for student learning and more specifically to a system for using smartpens as a tool for automatically assessing student learning that is simple and accurate.

BACKGROUND

There have been many attempts to understand how the organization of a student's solution to a problem relates to the correctness of that work. Understanding this relationship can provide early warnings and targeted feedback to students who are struggling in a course.

High enrollment in many undergraduate courses often makes manually grading every homework assignment prohibitively time consuming for instructors. However, when instructors do not grade homework assignments, students may not have sufficient incentive to complete their homework assignments diligently. As a compromise, instructors use tactics such as grading only a subset of problems on each homework assignment, providing grades for homework assignments solely based on completion, or selecting one question from each assignment for use as a quiz problem. These strategies reduce the work load for the instructor, but they severely limit the feedback that students receive.

Additionally, feedback during the course of a class, such as, for example a quiz or a test taken in the classroom cannot be conducted efficiently. Previously, others have used video cameras to record problem-solving activities, but the analysis of such data is a difficult and time-consuming task that requires human judgment that can lead to erroneous results. However, capturing the work as time-stamped pen strokes enables a much more precise and efficient analysis of the work.

Data mining techniques have been proposed as a solution for assessing student learning. Educational data mining uses machine learning techniques, data mining techniques, and other similar techniques to examine education research issues. A recent overview of this work has been provided by Cristóbal Romero and Sebastián Ventura in their paper: *Educational data mining: A Review of the State of the Art*. IEEE Transactions on Systems, Man, and Cybernetics—Part C: Applications and Reviews, 40(6):601-618, 2010. Disadvantageously, this current work relies on data collected in online environments such as web applications and intelligent tutoring systems that are different from standard classroom settings which changes the learning environment and skews the results.

Other researchers have used journaling to examine student work habits. For example, Marisa Orr, Lisa Benson, Matthew Ohland, and Sherrill Biggers in their paper: *Student Study Habits and Their Effectiveness in an Integrated Statics and Dynamics Class.*, In Proceedings of the 2008 American Society for Engineering Education Annual Conference and Exposition, 2008, examined students' journal responses about their study habits, including factors such as when and how they completed their homework, and if they took advantage of assistance programs. While the results proved interesting, journals capture students' perceptions of their work habits rather than an objective characterization of them. Our work provides a complement to this work as the system captures a detailed time stamped record of a student's work over the duration of the course.

Other researchers have explored various mechanisms for providing rapid feedback. For example, Antti Rasila, Linda Havola, Helle Majander, and Pekka Alestalo in their paper: *Automatic assessment in engineering mathematics: evaluation of the impact*, In Myller, E. (ed.), ReflekTori 2010 Symposium of Engineering Education, 37-45. Aalto University School of Science and Technology, 2010, explored the benefits of an online assessment tool for engineering mathematics. They found that automatic assessment was highly useful and improved the feedback provided to students. John Chen, Dexter Whittinghill, and Jennifer Kadlowec, used electronic conceptual quizzes during lectures within a statics course to help guide the lecture content as documented in their paper *Classes that click: Fast, rich feedback to enhance student learning and satisfaction*, Journal of Engineering Education, 99(2):159-168, 2010. They found that the rapid feedback produced a significant increase in student performance.

The work of Sharon Oviatt, Alex Arthur, and *Julia* Cohen in their paper *Quiet interfaces that help students think*, In Proceedings of the 19th annual ACM symposium on user interface software and technology (UIST '06), 191-200, New York, N.Y., USA, 2006, suggests that natural work environments are critical to student performance. In their examination of computer interfaces for completing geometry problems, they found that "as the interfaces departed more from familiar work practice, students would experience greater cognitive load such that performance would deteriorate in speed, attentional focus, meta-cognitive control, correctness of problem solutions, and memory." There have been several studies examining student work habits and performance in statics. For example, Paul Steif and Anna Dollár's *Study of Usage Patterns and Learning Gains in a Web-based Interactive Statics Course*, Journal of Engineering Education, 94(4):321-333, 2009, examined usage patterns of a web-based statics tutoring system to determine the effects on learning. They found that learning gains increased with the number of tutorial elements completed. This study relied on an online learning environment, while the system considers ordinary handwritten work. In another study, published in *Improving Problem Solving Performance by Inducing Talk about Salient Problem Features*, Journal of Engineering Education, 99(2):135-142, 2010, Paul Steif, Jamie Lobue, Anne Fay, and Levent Kara examined whether students can be induced to talk and think about the bodies in a statics problem, and if doing so can increase a student's performance. They used tablet PCs to record the students' spoken explanations and capture their handwritten solutions as time-stamped pen strokes. The study focused on the spoken explanations, with the record of written work was left mostly unanalyzed.

Researchers have also used video recordings to examine student problem solving. For example, Paul Blanc's *Solving a Non-routine Problem: What Helps, What Hinders?*, In Proceedings of the British Society for Research into Learning Mathematics, 19(2):1-6, 1999, examined video recordings of student work in mathematics and analyzed the path that students used to solve an example problem. Although Blanc recorded more than 75 problem solutions, only two were analyzed in his paper. That speaks to the labor intensive nature of analyzing video records. Additionally, human error can be introduced using this technique.

A long standing need of educators is a means to rapidly and inexpensively identify students who may be struggling in a course so that extra assistance can be provided. Therefore there is a need for a system for using smartpens as a tool for automatically assessing student learning that is simple and accurate.

BRIEF DESCRIPTION OF THE DRAWINGS

These and other features, aspects and advantages of the present invention will become better understood with regard to the following description, appended claims, and accompanying figures where:

SUMMARY

Figure 1:
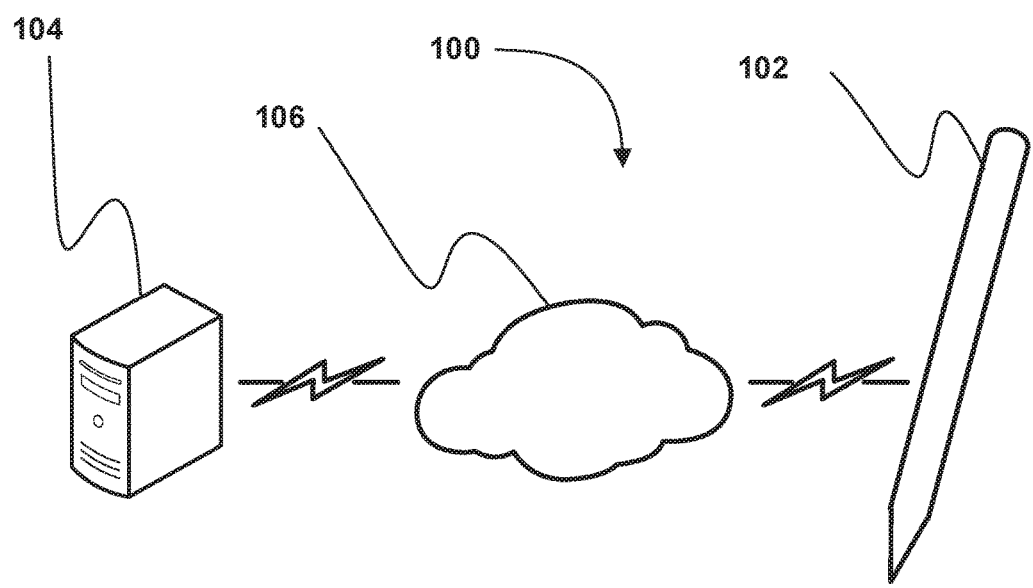
FIG. 1 is a diagram of a system for using smartpens as a tool for automatically assessing student learning according to one embodiment.

The present invention solves the problems of the prior art be providing a system for using smartpens as a tool for automatically assessing student learning that is simple and accurate. The system has a computer having at least one processor, a memory, a storage, and communications through a protocol, one or more than one smartpen communicatively coupled to the computer and a plurality of software modules each comprising non-transitory instructions executable on the processor. The software modules include at least a characterization module for characterizing spatial and temporal organization of a student's work, and machine learning module utilizing the spatial and temporal organization to assess student learning.

The characterization module can characterize steps in the spatial and temporal organization of a student's work to create a solution history. The characterization module creates a discretized activity sequence of the solution history. The discretized activities are selected from the group consisting of drawing free body diagrams, writing equations, drawing cross-outs, work on other problems, and no activity.

The characterization module has one or more than one sub-modules for computing one or more temporal organization features of the solution history. The sub-modules can be a common symbols and letters shape recognizer module, a machine learning module for pen stroke classification, a large stroke grouping module for pen strokes based on the distance and elapsed time between the strokes, and an intra-grouping classification module for correcting errors. The temporal organization features are selected from the group consisting of free body diagram effort, equation effort, entropy, complexity, other problems, and breaks.

The characterization module has one or more than one sub-module for computing one or more spatial organization features, such as, out-of-order strokes, earlier-neighbor strokes or both out-of-order strokes and earlier-neighbor strokes. The out-of-order strokes are selected from the group consisting of out-of-order-10-20, out-of-order-20-30, out-of-order-30-40, out-of-order-40-50, out-of-order-50-60, and out-of-order-60-plus. The earlier-neighbor strokes are selected from the group consisting of earlier-neighbor-10-20, earlier-neighbor-20-30, earlier-neighbor-30-40, earlier-neighbor-40-50, earlier-neighbor-50-60, and earlier-neighbor-60-plus.

The characterization module also computes groupings of solution elements into spatial clusters. The spatial and temporal organization of the solution history are computed and described by features from the spatial clusters. The features computed from the spatial clusters can be the number of diagrams, free body diagram clusters, free body diagram revisits, free body diagram revisit strokes, number of equation clusters, equation area fractions, equation revisits, equation revisit strokes or any combination thereof.

The characterization module can also represent a cross-out by a set of features comprising diagrams, free body diagram strokes crossed-out, equation strokes crossed-out, big-cross-outs, typo-cross-outs, and ps-cross-outs. The characterization module characterizes the solution history with features including amount of writing and or time spent writing by the student. The detected features of the amount of writing and the time spent writing can include median free body diagram stroke length, median equation stroke length, median cross-out stroke length, a number of free body diagram strokes, a number of equation strokes, and a number of cross-out strokes.

The machine learning module detects features in the solution history to calculate a probability of correctness of the student's solution to a problem, to calculate a probability of student performance in a course, and to identify students at risk of poor performance in a course.

The system also has an automatic stroke-labeling module to determine a category for each pen stroke in a student's work.

There is also provided a method for using smartpens as a tool for automatically assessing student learning that is simple and accurate. First, pen stroke data is received from one or more than one smartpen communicatively coupled to a computer. Then, the pen stroke data is classified to assess student learning. To classify the pen stroke data the system first recognizes letters, mathematical symbols, arrows, and boxes. Then, classifies single strokes into one of three semantic classes. Next, the classified strokes are grouped. Finally, errors within each group are corrected.

The method can also compute features and semantically classify strokes using an automatic character recognition module selected from the group consisting of an image-based recognizer, a domain-specific recognizer and a single-character recognizer.

DETAILED DESCRIPTION

The present invention overcomes the limitations of the prior art by providing a system for using smartpens as a tool for automatically assessing student learning. Smartpens provide the same function as a traditional ink pen but also records the work as time-stamped pen strokes, enabling data collection about the sequence of pen strokes. Smartpens enable the capture of students' ordinary work on homework and exam problems in a digital form. Using the new and novel data mining techniques, the system 100 and 200 can automatically distinguish between successful and unsuccessful students. The system 100 and 200 can detect students at risk of failure so that targeted support can be provided. The system 100 and 200 can also construct "learning profiles" that are used to target instructional resources.

Additionally, the system 100 and 200 can be used for automated grading of student work. This is an important feature of the system 100 and 200 as budgets tighten and class sizes increase. Also, the system 100 and 200 can be used for online instruction including instruction in massive open online courses (MOOCs). MOOCs are poised to restructure postsecondary education, but they must first overcome a significant flaw: the inability to assess what students have learned. The present invention solves this problem by automatically assessing students' performance and enabling automated coaching in MOOCs.

Also, a digital record of student coursework is recorded electronically, uploaded to a server, and automatically analyzed to estimate student performance. The analysis provides the instructor with an assessment of the students' performance and also provides feedback to the students, without the time-consuming task of manually inspecting the work. The system 100 and 200 can also determine how the organization of a student's solution to a problem relates to the correctness of the work.

The system 100 and 200 examines the history of the solution construction process to evaluate the correctness of the work. Solution histories were characterized by a number of quantitative features describing the temporal and spatial organization of the work. For example, some features describe the order in which various problem-solving activities, such as the construction of free body diagrams and equilibrium equations, are performed and others describe the amount of time spent on each activity. The spatial organization of student's work is characterized by the extent to that a student revisits earlier parts of a solution to revise their work.

Cross-validated regression models have been constructed using a relaxed lasso method to determine a correlation between these features and student performance. On average, the models explained 43% of the variance in performance. This is a surprising result in that the features do not actually consider the semantic content of the writing. The relaxed lasso method also identified the features that were most predictive of problem correctness, thus giving insights into which student behaviors are indicative of high or low performance. For example, revising work long after it was written may indicate low performance. While the examples presented herein are focused on engineering statics, the system 100 and 200 and method will generalize to other domains where problem solutions include both diagrams and equations.

A unique digital record of students' handwritten solutions enables the system 100 and 200 to automatically analyze student work habits in a natural environment, thereby increasing the speed and reducing errors found in the prior art for assessing student learning.

Various aspects of this invention are described in more detail in the following publications by the inventors, each of which is incorporated in its entirety into this document by reference:

1. *Automatic Handwritten Statics Solution Classification And Its Applications In Predicting Student Performance*, by Han-lung Lin, Thomas Stahovich and James Herold.
2. *An Examination of the Relationship Between the Temporal and Spatial Organization of a Student's Handwritten Statics Solution and Its Correctness*, by Timothy Scott Van Arsdale.
3. *Automatically Understanding Handwritten Self-Explanations*, by Thomas Stahovich and James Herold.
4. *Characterizing Students Handwritten Self-Explanations*, by Thomas Stahovich and James Herold.
5. *Does Neatness Count? What The Organization Of Student Work Says About Understanding*, by Timothy S. Van Arsdale and Thomas Stahovich.
6. *Predicting Course Performance from Homework Habits*, by K. Rawson and Thomas Stahovich.
7. *Using Education Informatics to Identify Correlations Between Homework Effort and Performance*, by Thomas Stahovich and James Herold.

All dimensions specified in this disclosure are by way of example only and are not intended to be limiting. Further, the proportions shown in the Figures are not necessarily to scale. As will be understood by those with skill in the art with reference to this disclosure, the actual dimensions and proportions of any system, any device or part of a system or device disclosed in this disclosure will be determined by its intended use.

Systems, methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific detail. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

In some system embodiments, the students' course work can be recorded via the system whereby the work is recorded as time-stamped pen strokes. In some embodiments, the system uses a smartpen, e.g., Livescribe™ Smartpen, that can output digitized pen strokes and store them as sequences of time stamped coordinates, or smartpen output. The output is a digital record of the individual students' coursework in the form time stamped (x,y) coordinates of every pen stroke. For some systems, the solution history of each student for each problem then can be characterized with a number of quantitative features describing the temporal and spatial organization of the work.

In some embodiments, the features can comprise spatial organization features. In some embodiments, the features can comprise temporal organization features. In some embodiments, the features can comprise basic pen stroke features. For some embodiments, the temporal organization features can comprise the amount of time spent on equations (EQU Effort), the amount of time spent on Free Body diagrams (FBD Effort), the fraction of the work that was written out of order (Out-of-Order), the number of intervals in which no work was done (Break), or the number of times the student interrupted their work on the problem to work on other problems (an Other-Problem feature). In addition, the system may also have features that describe the sequencing of the activities using information theory notions of entropy and complexity to capture distinctions. For some embodiments, spatial organization features can comprise examining out-of-order strokes, spatial clustering of the solutions, revisits. For some embodiments, the features can comprise cross-out features, or an indication of revised work. As a result, some systems compare those parameters to create an automatic assessment that can inexpensively identify students who may be struggling in a course and need extra support.

In some embodiments, the system can measure an individual student's solution pace as one means to measure whether student learning occurs. In some systems, the student's normalized total homework time can be compared to the student's normalized total quiz time, where the individual student's time is normalized by dividing the individual time by the class average (e.g. dividing the individual Total Homework Time by the class average on that assignment). While not wanting to be limited by theory, it is thought that a student that takes a long time to complete the homework assignment but solves the quiz problem faster than the class average would appear to have learned the underlying statics concepts and is now able to apply this knowledge. However, a student that was faster than average on the homework assignment but slower than the class average on the quiz would appear to have not learned the applicable concepts (e.g., statics concepts).

In some systems, the system can examine the smartpen output to classify strokes to predict a student's performance (e.g., final examination performance). Some systems can measure the total amount of ink drawn in an assignment, which is measured by summing the path length of every pen stroke within the assignment. In some systems, the total amount of ink per student can be normalized by the largest amount of ink found in any single assignment. While not wanting to be limited by theory, it is thought that students who spend less than some threshold of time or effort working on their homework assignments are likely to perform poorly on an exam (e.g., a final examination).

Furthermore, embodiments can be implemented by hardware, software, firmware, middleware, microcode, or a combination thereof. When implemented in software, firmware, middleware or microcode, the program code or code segments to perform the necessary tasks can be stored in a machine-readable medium such as a storage medium or other storage(s). One or more than one processor can perform the necessary tasks in series, concurrently, distributed or in parallel. A code segment can represent a procedure, a function, a subprogram, a program, a routine, a subroutine, a module, a software package, a class, or a combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted through a suitable means including memory sharing, message passing, token passing, network transmission, wireless transmission, etc.

The software identified above can also be constructed in a module. A module is a logically self-contained and discrete part of a larger computer program, for example, a subroutine or a co-routine. Modules are typically incorporated into the program through interfaces. A module interface expresses the elements that are provided and required by the module. The elements defined in the interface are detectable by other modules. The implementation contains the executable code that corresponds to the elements declared in the interface. Modules perform logically discrete functions. A module can interact with other modules of the system 100 and 200 to achieve its purpose.

In the following description, certain terminology is used to describe certain features of one or more embodiments of the invention.

The term "smartpen" refers to a multimodal computer writing tool comprising at least a processor and a storage that can record and store writing and drawing and synchronize the stored information with second computer using wired or wireless communications protocols.

The term "free body diagram" refers to a diagram used by a student to solve a problem. As an example, in the subject of statics, a "free body diagram" describes the forces acting on a system. As another example, in the field of fluid mechanics, a "free body diagram" describes a control volume. As another example, in the field of engineering economics, a "free body diagram" represents cash flows.

The term "equation" refers to an equation used by a student to solve a problem.

The term "solution history" refers to the sequence of steps that a student would use to solve a given problem that can be characterized using the temporal and spatial distribution of the work done by the student.

Various embodiments provide a system and a method for using smartpens as a tool for automatically assessing student learning. The system 100 and 200 and method will now be disclosed in detail.

Figure 2:
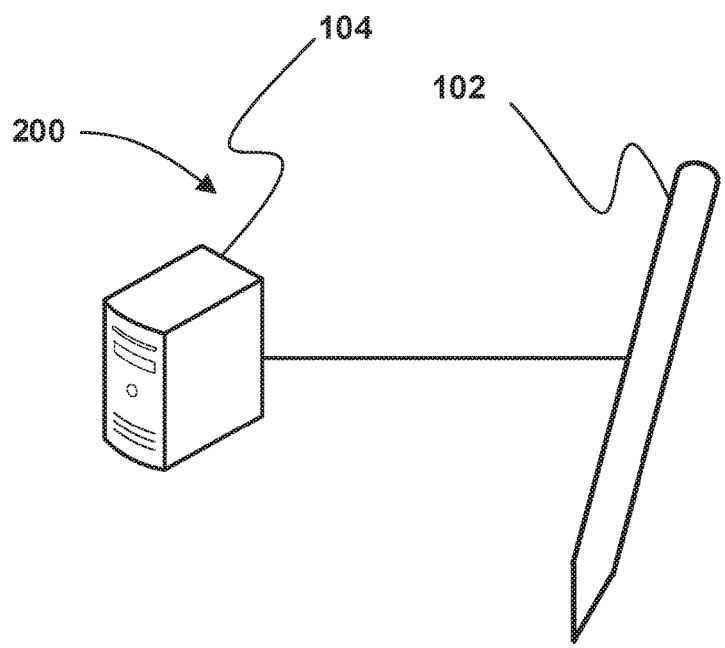
FIG. 2 is a diagram of a system for using smartpens as a tool for automatically assessing student learning according to another embodiment.

Referring now to FIGS. 1 and 2, there is shown diagrams 100 and 200 of a system for using smartpens 102 as a tool for automatically assessing student learning. According to one embodiment, the system 100 comprises one or more than one smartpen 102 wirelessly coupled to one or more than one computer 104. In another embodiment, the one or more than one smartpen 102 can be directly connected to the one or more than one computer 202 to transfer data stored on the smartpen 102. The one or more than one smartpen 102 can comprise instructions executable on the smartpen 102 to record, store and transmit data recorded during student use. More specifically, pen stroke data that is more amenable to automated analysis using the system 100 and 200.

The one or more than one smartpen 102 record solutions as time-stamped pen strokes data, providing not only the final ink on the page, but also the order that it was written. For example, there are features that describe the order that various problem-solving activities (such as the construction of free body diagrams and equilibrium equations) are performed, and the amount of time spent on each activity. Because the one or more than one smartpen 102 uses ink, students cannot erase their errors and must cross them out. The system 100 and 200 characterizes cross-outs by the delay between when ink was written and when it was crossed out. The system 100 and 200 characterizes the spatial organization of the work by the extent that a student revisits earlier parts of a solution to revise the work. The system 100 and 200 then constructs cross-validated regression models to determine the extent that these features correlate with the correctness of the solution. On average, about 43% of the variance in performance could be explained by these features, without considering the semantic content of the writing. Additional modules can be added to the system 100 and 200 to analyze semantic content and increase accuracy of the results. Therefore, the examples given herein are not meant to be limiting, only demonstrative.

Figure 3:
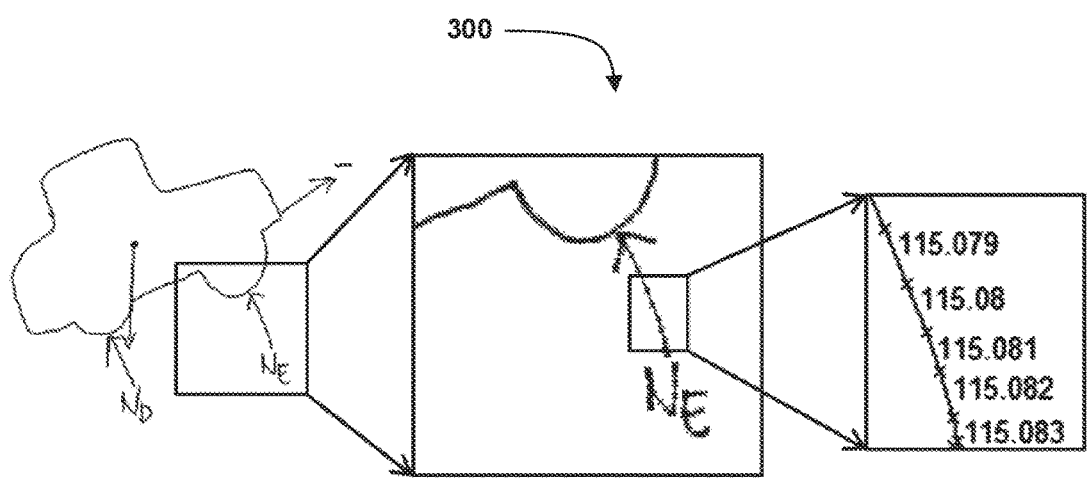
FIG. 3 is a diagram of digitized pen stroke data of a student's solution to a problem.

Referring now to FIG. 3, there is shown a diagram 300 of digitized pen stroke data of a student's solution to a problem. As can be seen, the diagram 300 comprises a free body diagram 302 of a car, on the left, rendered from pen stroke data; a selection 304 of the diagram 302 showing data points 306 in the center of the diagram; and a subsection of data points 308 including time stamps in seconds elapsed from the start of the problem solution.

The pen strokes are labeled according to the type of content that they represent: free body diagrams 302, equations, or cross-outs of incorrect work (the ink of the one or more than one smartpen 102 cannot be erased).

Figure 4:
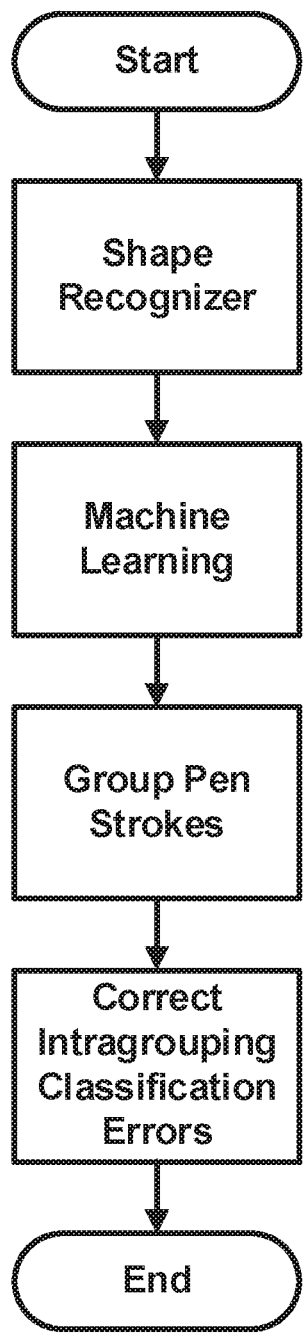
FIG. 4 is a flowchart diagram of some steps of a method for using smartpens as a tool for automatically assessing student learning according to one embodiment.
Figure 5:
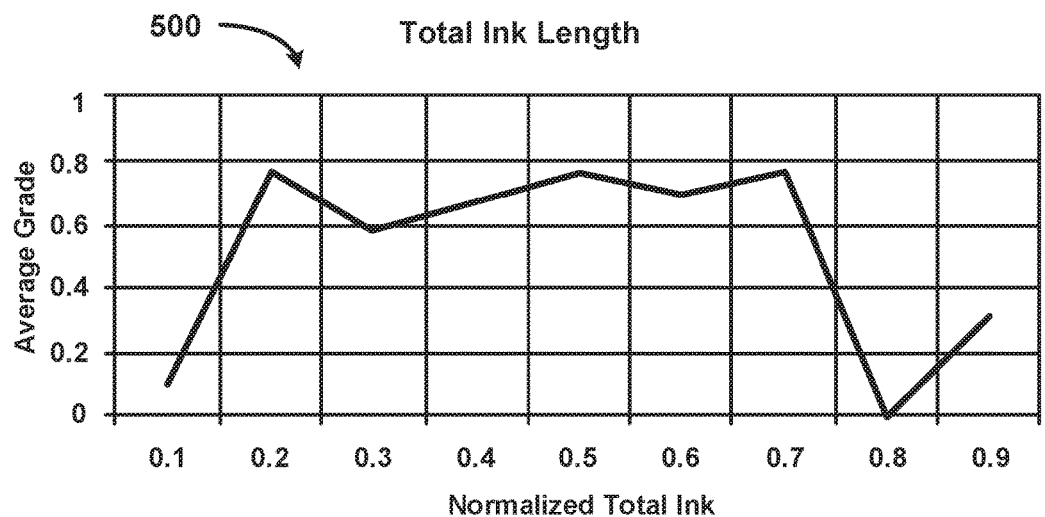
FIG. 5 is a diagram plotting average grade as a function of the normalized total ink length.

Referring now to FIG. 4, there is shown a FIG. 4 is a flowchart diagram 400 of some steps of a method for using one or more than one smartpen 102 as a tool for automatically assessing student learning according to one embodiment. As can be seen the system 100 and 200 can comprise a four-stage classification algorithm for automatically labeling pen strokes. First, common symbols and letters are identified using a shape recognizer 402. Then, pen strokes are classified using a machine learning technique 404. Next, pen strokes are grouped 406 into larger stroke groups based on the distance and elapsed time between the strokes. Finally, intra-grouping classification errors are corrected 408.

The system 100 and 200 analyzes problem-solving activities using the kind of solution element each pen stroke comprises. Specifically, each pen stroke is categorized as an element of a free body diagram, an element of an equation, or a cross-out (i.e., a stroke used to cross-out work). The system 100 and 200 uses an automatic stroke-labeling system to determine the category of each pen stroke. The system 100 and 200 extends a prior art technique by adding thirteen new domain-dependent features to characterize static solutions. This novel stroke-labeling system has at least a 93% accuracy that is sufficient for the system 100 and 200 to automatically predict student performance.

The system 100 and 200 comprises a classification algorithm that comprises four stages: (1) recognizing 402 letters, mathematical symbols, arrows, and boxes (2) classifying 404 single strokes into one of three semantic classes, (3) grouping 406 classified strokes (4) and correcting 408 errors within each group. Each of the stages will now be discussed in detail.

Character Recognition

The system 100 and 200 uses automatic character recognition module 402 to compute features for and semantically classifying strokes. The automatic character recognition 402 can be selected from the group consisting of an image-based recognizer, a domain-specific recognizer and a single-character recognizer. In a preferred embodiment, the system 100 and 200 uses the image-based recognizer, because of its recognition capability for multi-stroke characters and tolerance for over-stroking, that is common in handwritten solutions. In another preferred embodiment, the system 100 and 200 can use a special-purpose single-character recognizer to identify "plus signs", "equal signs", "answer boxes" and "arrows".

Single-Stroke Classification

The system 100 and 200 maps each of the recognized characters from the previous module 402 to one of three semantic classes: a free body diagram, an equation, and a cross-out. The system 100 and 200 uses a novel feature based classification algorithm that is a combination of the algorithm presented by Peterson et al. in their paper titled "*Grouping Strokes into Shapes in Hand-Drawn Diagrams*," Proc. of the 24th AAAI Conference on Artificial Intelligence (AAAI-10), 2010, pp. 974-979, by Peterson, Thomas Stahovich, Eric Doi, and Christine Alvarado, and extends that algorithm by adding a number of features that leverage domain-specific heuristics. These additional features greatly boost recognition accuracy and provide novel and valuable insight into students' solution processes essential for automatic assessment. These features characterize various aspects of students' handwritten solution style, such as, for example, typical stroke size, location on the page, presence of mathematical symbols, and total ink used.

Typical machine learning 404 approaches, such as the one presented by Peterson et al., have difficulty accurately classifying rarely occurring cases. Therefore, the system 100 and 200 comprises a trained decision tree using thirteen features to identify whether a stroke is a cross-out or not. The thirteen features characterize the underlying ink density and straightness of each stroke. Cross-out strokes typically have high underlying ink density and students frequently cross-out strokes with a single straight line. The system 100 and 200 first processes strokes by using the cross-out recognizer module. Strokes not positively identified as a cross-out are then classified using the extended classification module.

Stroke Grouping

There are at least two types of errors that can be made in classifying strokes: actual errors and contextual errors. Actual errors are straightforward, incorrect classifications, such as part of a beam in a free body diagram that can be mislabeled as an equation stroke. Contextual errors are subtler and depend on the situation in which a stroke appears. For example, the letter "F", appears frequently in both free body diagrams and equations, depending on whether the letter can be used as a force label or as a variable in an equation. In both cases, the geometry of the letter will be the same; it is the context that determines the semantic class of the stroke. The system 100 and 200 uses a module to classify strokes that are both temporally close and spatially close as part of the same group. These groupings provide context for each stroke that is used later to correct errors.

The stroke grouping module comprises three steps. First, stroke pairs that both occur within a specified time interval of each other and are within a specified Euclidean distance are grouped together. Next, stroke pairs whose bounding boxes overlap horizontally with each other are grouped together. Finally, groups containing too few strokes are merged with the spatially nearest group.

Error Correction

The error correction module identifies strokes that are spatially and temporally close to one another. These strokes typically correspond to the same semantic class. Students often write equations one after another and draw free body diagrams within one region of a page. The error correction module analyzes the strokes within each group resulting from the previous step and identifies them as belonging to the same semantic class. Classification errors within each stroke grouping are corrected using a majority vote and two simple heuristics. The error correction module identifies that if a percentage of arrow strokes within a group is above a threshold, then all strokes within the group are classified as free body diagram strokes because free body diagrams typically contain a large number of arrows. Then, if a percentage of mathematical symbol strokes within a group is above a threshold, all strokes within the group are classified as equation strokes, because equations typically contain more mathematical symbols than free body diagrams. Lastly, if neither of the previous two thresholds is satisfied, all strokes are classified as the majority class occurring within that group.

To examine the correlation between the properties of the solution histories and the correctness of the work, those properties are represented quantitatively. The solution history is characterized in terms of the temporal and spatial distribution of the work. More specifically, five types of features are considered: properties of the temporal organization of the work, properties of the spatial organization of the work, properties of the spatial clustering of the work, properties of the cross-outs, and basic pen stroke properties. These features are described in detail in the following sections.

Temporal Organization Features

In characterizing the temporal distribution of the work in a solution history, the system 100 and 200 distinguish between four solution activities: drawing free body diagrams (FBDs), constructing and solving equilibrium equations, crossing out work, and working on other problems. The first three activities are inferred from the semantic labels assigned to the pen strokes by the classification algorithm for automatically labeling pen strokes.

To represent the sequence of solution activities, the system 100 and 200 divides the problem solution into n equal-time intervals. Each interval is labeled according to the solution activity that occurs most frequently during that interval, which is computed using the pen stroke labels. For example, if 70% of the drawing time in an interval was spent drawing free body diagram pen strokes, and the remaining time was spent drawing equation pen strokes, the interval as a whole would be characterized by the free body diagram activity. If no writing occurs during an interval, it is labeled as a break. In practice, using a value of 400 for n provides adequate detail to enable meaningful analysis of the solution. One advantage of this representation is that it abstracts away the total elapsed time, making it possible to directly compare the work of all students regardless of their total solution time.

Figure 9:
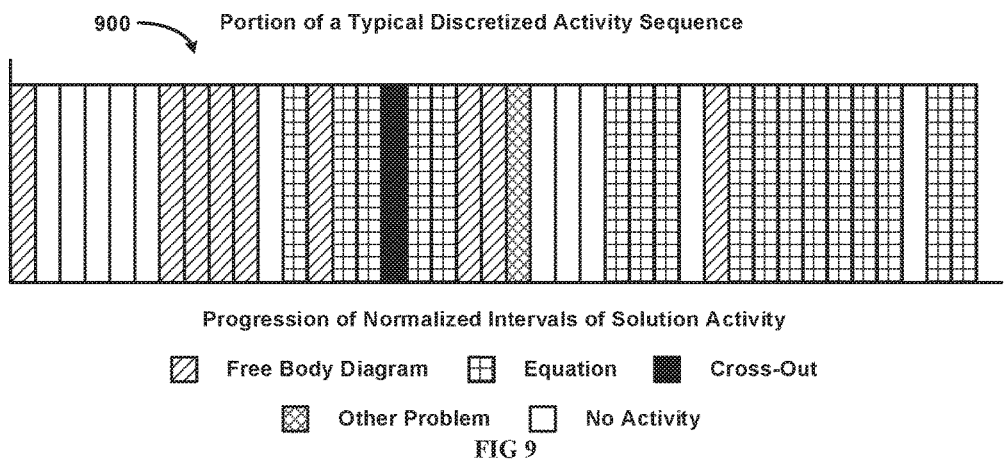
FIG. 9 is a diagram of a portion of a typical discretized activity sequence.

If the student interrupts his or her work on a problem to work on other problems, the system modify this representation slightly. If there are m such interruptions, the system divide the work on the problem in question into n−m equal intervals and compute their labels as before. Each of the m interruptions is then represented by an additional interval labeled as "other problem." FIG. 9 shows a portion of a typical activity sequence.

The distribution of activities in the discretized solution history gives important insights into the student's thought process. The system have designed a set of eight features to capture these insights. These features are summarized in Table 1. The first four features describe the amount of time spent on various activities. FBD Effort is the total number of activity intervals spent on free body diagrams, while EQN Effort is the number spent on equations. The Break feature is the number of intervals in which no work was done, while the Other-Problem feature is the number of times the student interrupted his/her work on the problem to work on other problems (this is the value "m" described above). Taking breaks and working on other problems may indicate that the student was struggling on the current problem.

TABLE 1

Summary of the Temporal Organization features.
Temporal Organization Features

| | |
|---|---|
| FBD Effort | Number of activity intervals spent on FBD activity. |
| EQN Effort | Number of activity intervals spent on equation activity. |
| Break | Number of activity intervals in which a student had no activity. |
| Other-Problem | Number of times the student interrupted their work on a problem to work on other problems. |
| Entropy | Entropy of the discretized activity sequence. |
| Complexity | Complexity of the discretized activity sequence. |
| FBD to Equation Activity Change | Number of activity changes from FBDs to equations. |
| Equation to FBD Activity Change | Number of activity changes from equations to FBDs. |
| Num Small Breaks | Number of breaks between 2 and 40 seconds in duration. |
| Num Medium Breaks | Number of breaks between 40 and 160 seconds in duration. |
| Num Large Breaks | Number of breaks at least 160 seconds in duration. |

Table 1: Summary of the Temporal Organization Features

These first four features describe only the amount of effort spent on each type of activity. Four additional features describe the sequencing of the activities. An expert might solve a problem by first constructing all of the free body diagrams, and then constructing all of the equations. This would result in a very simple activity distribution. A novice student who is struggling on a problem might repeatedly move from one activity to another in a much more complex pattern. The system 100 and 200 uses information theory notions of complexity and entropy to capture these distinctions.

The Kolmogorov complexity of a sequence is a measure of the minimum length required to describe it. To estimate this value, the system 100 and 200 first represents the sequence as a character string, assigning a unique letter to each of the four types of activities. The system 100 and 200 then uses a standard data compression algorithm (the ZLIB implementation of DEFLATE) to compress the string. The system 100 and 200 defines the Complexity of the sequence as the length of the compressed string. A random sequence of activities will result in a large value for this feature, while a sequence comprised of a few large blocks of activities will result in a small value.

The system 100 and 200 uses the Entropy of the sequence to measure the balance of effort between the activities. If the sequence contains, for example, only one type of activity, the entropy is relatively small. If, on the other hand, an equal amount of time is spent on each of the two types of activities, the entropy is maximal. The system 100 and 200 computes the Entropy using the following approach:

$$\text{Entropy} = \sum_i -(n_i/n)\ln(n_i/n) \quad (\text{Eq. 1})$$

where $n_i$ the number of occurrences of a particular type of activity, n is the total number of activities, and the sum is taken over the two main types of activities. (In this computation, assume $\ln(0)=0$.)

Two additional features consider transitions between free body diagram activity and equation activity. The number of transitions from the former to the latter is represented by the FBD to Equation Activity Change feature, while the converse is represented by the Equation to FBD Activity Change feature. These features are calculated from the discretized activity sequence with the cross-out, break, and "other problem" intervals removed. Free body diagrams are a tool for constructing equilibrium equations and thus the former often precede the latter. These two activity change features are useful for detecting if students perform these tasks sequentially or if they iterate between them, for example.

The Break feature provides a measure of the total fraction of the activity sequence during which the student was not working on any solution activity. Three additional features characterize the size distribution of the individual periods of non-activity. More specifically, these features count the Num Small Breaks (breaks between 2 and 40 seconds in duration), the Num Medium Breaks (breaks between 40 and 160 seconds in duration), and the Num Large Breaks (breaks at least 160 seconds in duration). These features are computed directly from the original timeline of the solution history, not from the normalized discrete activity sequence.

Spatial Organization Features

The spatial organization of a solution on the page gives additional insights about the student's problem-solving process. For example, a student who starts at the top of a page and progresses downward may understand the problem better than a student who frequently revisits earlier work and revises it. The system 100 and 200 describes the spatial organization with two types of features (Table 2 )that consider the progression of the work on the page and the local temporal history in the neighborhood of each stroke.

TABLE 3

Summary of the Spatial Organization features
Spatial Organization Features

| | |
|---|---|
| Out-of-Order-10-20 | Fraction of strokes that differ from their reference time by 10% to 20% of the total problem time. |
| Out-of-Order-20-30 | Fraction that differ by 20%-30%. |
| Out-of-Order-30-40 | Fraction that differ by 30%-40%. |
| Out-of-Order-40-50 | Fraction that differ by 40%-50%. |
| Out-of-Order-50-60 | Fraction that differ by 50%-60%. |
| Out-of-Order-60 plus | Fraction that differ by over 60%. |
| Earlier-Neighbor-10-20 | Fraction of strokes that have a delay from neighboring strokes of 10% to 20% of the total problem time. |
| Earlier-Neighbor-20-30 | Fraction that have a delay of 20%-30%. |
| Earlier-Neighbor-30-40 | Fraction that have a delay of 30%-40%. |
| Earlier-Neighbor-40-50 | Fraction that have a delay of 40%-50%. |
| Earlier-Neighbor-50-60 | Fraction that have a delay of 50%-60%. |
| Earlier-Neighbor-60 plus | Fraction that have a delay over 60%. |

Figure 10:
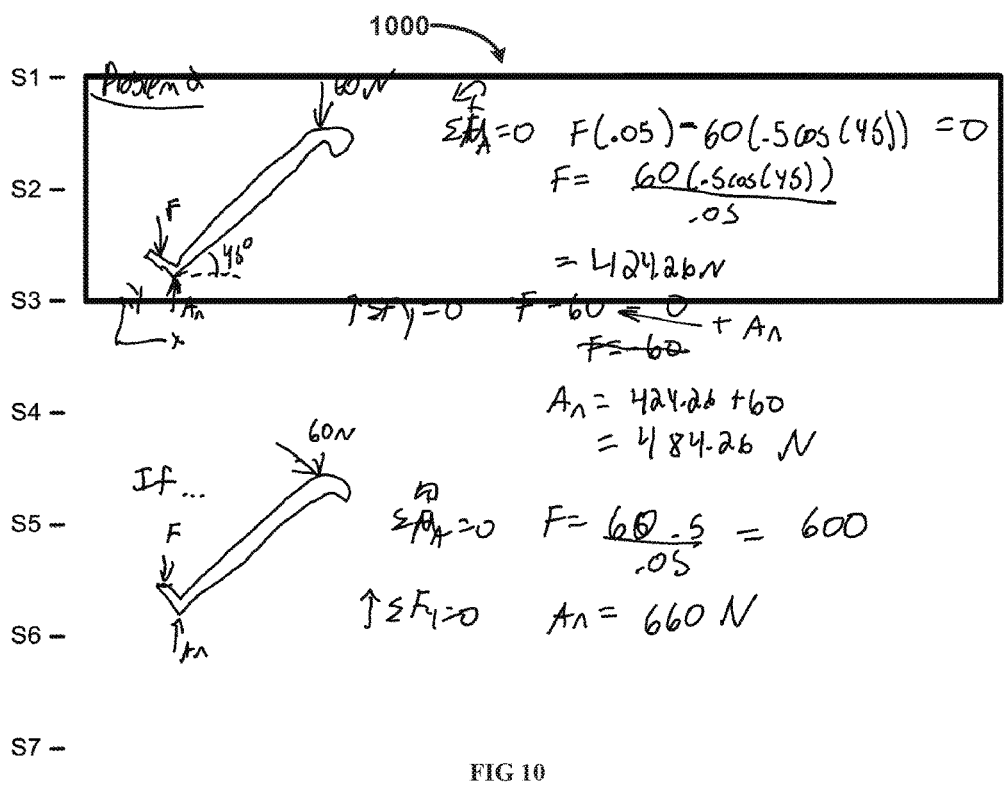
FIG. 10 is a diagram of a sliding window used to compute a reference timeline.

The system 100 and 200 describes progression down the page in terms of deviation from a reference progression in which each stroke is drawn later than the ones above it. The system 100 and 200 uses a sliding window 1000 to construct this reference timeline as illustrated in FIG. 10. A range of sized can be used for the window. For example, in one implementation the system 100 and 200 used a 2 inch window. This height was chosen based on the inspection of the resulting timelines. The window is initially placed at the top of the work. The reference time assigned to the location of the top of the window is computed as the time of the earliest stroke in the window. The center point of a stroke's bounding box is used to determine if the stroke is in the window. The window is then slid down the page a small distance. The reference time assigned to the new location of the top of the window is again that of the earliest stroke in the window, unless that is earlier than the time assigned to the previous window. In that case, the reference time is taken to be that of the previous window. The process is repeated until the bottom of the solution is reached, resulting in a sequence of monotonically increasing reference time values, equally spaced down the solution page. A variety of values can be used for the distance the window is slid. For example, in one implementation, the window is slid 1 inch on each step. This distance was chosen based on the inspection of the resulting timelines. If a solution spans multiple pages, the pages are ordered by the average stroke time on each page and are stacked vertically, with a 0.5 in. gap between each. This results in a single progression of work for each problem solution.

Figure 12:
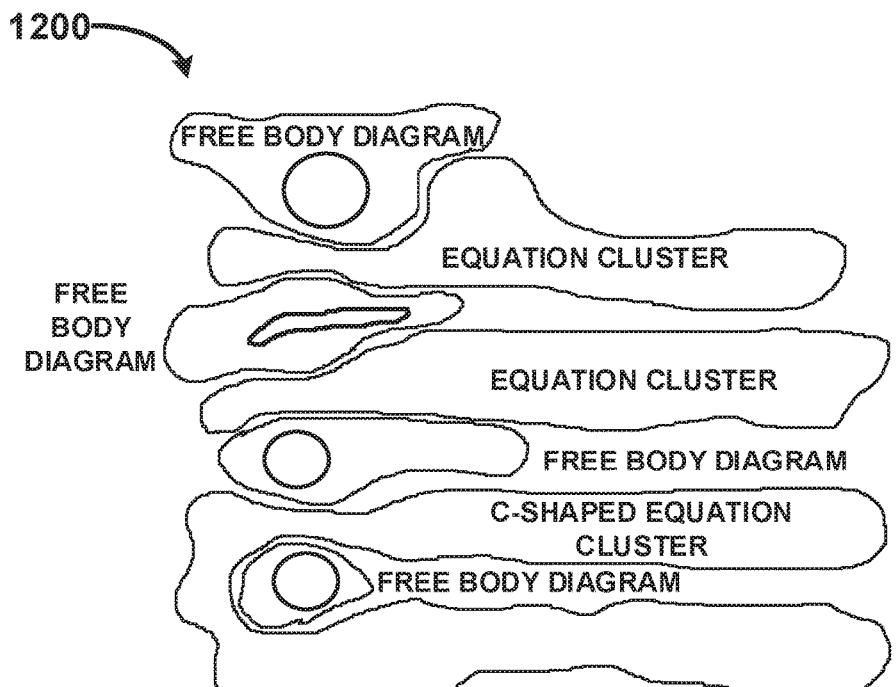
FIG. 12 is a diagram of clusters computed from the influence function in FIG. 11.

Once the reference timeline has been constructed, it is used to identify strokes that are inconsistent with a topdown spatial progression, which are called "out-of-orders"strokes. To do this, the system 100 and 200 computes the reference time for each, stroke's location (its midpoint) by linear interpolation of the reference timeline. If the time at which a pen stroke was drawn differs from this reference by at least 10% of the total solution time, the stroke is considered to be out-of-order. Six features are used to further characterize the out-of-order strokes by the extent to which they differ from their reference time as described in Table 2 For example, Out-of-Order-10-20 is the fraction of strokes that differ from the reference time by between 10% and 20% of the total solution time, while Out-of-Order-60 plus is the fraction of strokes that differ by 60% or more, The reference timeline provides a global view of the progression of work. A second type of feature provides a more local view of the progression by comparing the time stamp of a stroke to those of the nearby strokes that were drawn earlier. Two strokes are considered to be near each other if their expanded bounding boxes intersect (the strokes may actually intersect each other), For this calculation, the coordinate aligned bounding boxes of the strokes are expanded in all directions by 0.8 in.; this value was obtained with an optimization procedure. Each stroke is then characterized by the time delay between it and its earliest nearby stroke, Analogous to the Out-of-Order features, six features are used to characterize this time delay as described in Table 2 For example, Earlier-Neighbor-10-20 is the fraction of strokes with a delay between 10% and 20% of the total solution time. Strokes with a large delay may correspond to the student revising his or her work after an error is detected much later in the solution. This could occur, for example, if the student detects an inconsistency in the equilibrium equations and must revisit the free body diagram to fix the error. Students who frequently revisit earlier portions of their solution may be struggling with the concepts, Spatial Cluster Features Typical statics solutions are often organized into spatially distinct clusters of work. Each individual cluster typically represents a single substantial solution element, such as a free body diagram or a set of equilibrium equations. FIG. 12 shows an example with seven clusters: four containing free body diagrams and three containing equations.

Several features are computed that detect the spatial clustering of the work and the extent to which the work in the clusters is revised during the solution process. In computing these features, the system 100 and 200 defines a cluster as a region on the page containing strokes that represent a single solution activity (either free body diagram or equation activity), are near each other, and are distant from other strokes of the same activity.

Figure 11:
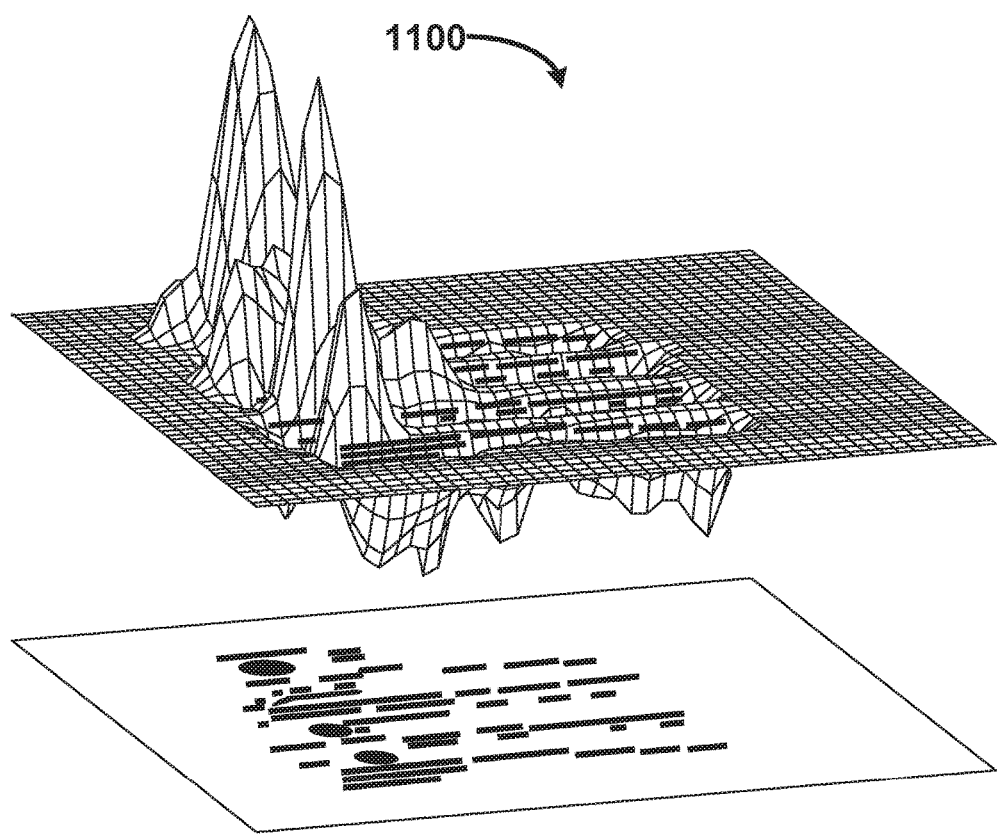
FIG. 11 is a diagram of a typical influence function for computing clusters, shown in context with an example of a student's work.

To compute the locations of clusters, the system 100 and 200 uses a Gaussian function to represent the "spatial influence" of each stroke. More specifically, at each point on the page, the system 100 and 200 determines an influence function that sums the signed influences of the strokes. Strokes from free body diagrams exert a positive influence, while those from equations exert a negative influence. This influence function, which is illustrated in FIG. 11, is computed as:

$$H(x, y) = \sum_i A * S e^{-\frac{d_i^2}{2c^2}}$$ (Eq. 2)

$$A = \begin{cases} 1 \text{ for } FBD \text{ strokes} \\ -1 \text{ for equations strokes} \end{cases}$$ (Eq. 3)

$$S = \text{maximum}\left(1.5 \text{ in., } 0.75 \text{ in.} + \frac{l_i}{3}\right)$$ (Eq. 4)

Here, $d_i$ is the minimum distance from stroke i to the point (x,y), c is a constant equal to 1.4 in., and $l_i$ is the length of the stroke (i.e., its arc length). The parameter S controls the maximum amplitude of the influence of a stroke, which increases with the stroke's length. However, the constant in the denominator (i.e., the "3") ensures that very long strokes do not dominate the calculation. Conversely, S has a minimum value (1.5 in) to ensure that even very short strokes have an appreciable maximum amplitude. As will be understood by those with skill in the art with reference to this disclosure any specifically mentioned constant referenced herein can be another number depending upon the implementation. Therefore, these examples are used by way of example and are not meant to be limiting.

Because of the exponential nature of H(x,y), strokes far from the point (x,y) exert little influence on that point. Thus, to achieve efficiency, the sum is taken over only those strokes that are near the point (x,y). A stroke is considered to be near if the coordinate-aligned bounding box is within 1.1 in. of the point.

The system 100 and 200 then computes the cluster boundaries as level curves of the function H(x,y). The boundaries of the free body diagram clusters are defined as level curves at H(x,y)=0.2, while the boundaries of the equation clusters are defined as level curves at H(x,y)=−0.2. (When computing the level curves, H(x,y) is sampled on a uniform grid with a spacing of 0.3 in.) Using values of +/−0.2 for the level curves tends to place the cluster boundaries near the periphery of the ink they enclose. By contrast, if the level curves were taken at H(x,y)=0, all regions of the page, even empty regions, would belong to some cluster. The parameters used for computing clusters were manually tuned so that the clusters closely matched the major solution elements for a set of sample sketches.

FIG. 12 shows the set of clusters computed from the influence function in FIG. 11. There are four clusters each representing a single, isolated free body diagram. There are three equation clusters. The top two each represent tight groupings of equations. The bottom cluster has a "C" shape. This cluster appears to contain two groupings of equations that are linked by a few pen strokes to the left of the lowest free body diagram cluster. Using a larger threshold for the level curves might split this cluster appropriately. However, this might also split portions off of the other clusters, such as the top of the uppermost equation cluster.

From these clusters the system 100 and 200 computes seven features, which are summarized in Table 3. Three characterize the number and size of the clusters. This includes the number of free body diagram clusters (Num FBD Clusters), the number of equation clusters (Num Equation Clusters), and the ratio of the net area of the equation clusters to the total area of all (Equation Area Fraction).

The remaining four cluster features describe the student's temporal progression through the clusters. FBD Revisits is the number of times the student interrupted his or her work to add additional pen strokes to an existing free body diagram cluster. FBD Revisit Strokes is the fraction of all pen strokes that were added to free body diagram clusters in this way. Equation Revisits and Equation Revisit Strokes are defined analogously.

TABLE 3

Summary of the Spatial Cluster features.
Spatial Cluster Features

| | |
|---|---|
| Num FBD Clusters | Number of FBD pen stroke clusters. |
| FBD Revisits | Number of times a student returned to a previous FBD cluster. |

TABLE 3-continued

Summary of the Spatial Cluster features.
Spatial Cluster Features

| | |
|---|---|
| FBD Revisit Strokes | Fraction of strokes in a solution that were added during FBD revisits. |
| Num Equation Clusters | Number of equation pen stroke clusters. |
| Equation Area Fraction | Ratio of the net area of the equation clusters to the total area of all clusters. |
| Equation Revisits | Number of times a student returned to a previous equation cluster. |
| Equation Revisit Strokes | Fraction of strokes in a solution that were added during equation revisits. |

Cross-Out Features

Cross-outs are a direct indication of revised work. The system 100 and 200 characterizes cross-outs in terms of the strokes that are deleted or "crossed out." The classification algorithm for automatically labeling pen strokes identifies individual cross-out strokes, but not complete cross-out gestures. For example, an "X" drawn with two pen strokes is often used to cross-out erroneous work. The system 100 and 200 defines a cross-out gesture as a set of consecutively drawn cross-out strokes that are all near each other. Cross-out strokes are near each other if the minimum distance between them is less than 1 in. or 15% of the stroke's arc length, whichever is smaller. These values were manually selected to achieve a balance between grouping the components of an intended gesture without erroneously grouping strokes from unrelated gestures.

To determine which strokes have been deleted by a cross-out gesture, the system 100 and 200 computes the convex hull of the strokes comprising that gesture. Any other pen strokes which have a convex hull that intersect the convex hull of a gesture are considered to have been deleted.

shows the convex hulls of a zigzag-shaped cross-out gesture and a "X" cross-out gesture as well as the strokes that they delete.

The system 100 and 200 distinguishes between two kinds of cross-out gestures, which the system 100 and 200 identifies as "typo cross-outs" and "problem-solving cross-outs". The former are cases in which the student writes something and quickly crosses it out, as if correcting a typographical error. The latter are cases in which there is a substantial delay between the time the ink was written and when it was crossed out: these cases are more likely to be corrections of problem-solving errors. The system 100 and 200 uses a threshold of 16 seconds as the boundary between the two types of cross-outs. This threshold was based on an optimization procedure.

The system 100 and 200 characterize cross-out gestures with five features which are summarized in Table 4 The Typo-Cross-Outs and PS-Cross-Outs features are the numbers of typo and problemsolving cross out gestures, respectively The Big-Cross-Outs feature is the number of cross-out gestures that delete (cover) 10 or more pen strokes and thus represents a revision of a substantial amount of work. (This threshold was set based on an optimization procedure.) Additionally, the system 100 and 200 counts the total number of free body diagram and equation strokes that were deleted by cross-out gestures producing the features FBD Strokes Crossed-Out and Equation Strokes Crossed-Out, respectively.

TABLE 4

Summary of the Cross-out features.
Cross-out Features

| | |
|---|---|
| FBD Strokes Crossed-Out | Number of FBD strokes that were crossed-out. |
| Equation Strokes Crossed-Out | Number of equation strokes that were crossed-out. |
| Big-Cross-Outs | Number of cross-out gestures which removed 10 or more strokes. |
| Typo-Cross-Outs | Number of cross-out gestures which occurred within 16 seconds of underlying ink. |
| PS-Cross-Outs | Number of cross-out gestures which occurred after 16 seconds of underlying ink. |

Basic Pen Stroke Features

The system 100 and 200 includes six Basic Pen Stroke features in. order to provide a measure of the amount of work in a solution and the student's writing style. These are summarized in Table 5 These features include the number of strokes written for each activity category (Num FBD Strokes, Num of Equation Strokes, and Num Cross-Out Strokes), as well as the median stroke length for each category (Median FBD Stroke Length, Median Equation Stroke Length, and Median Cross-Out Stroke Length).

TABLE 5

Summary of the Basic Pen Stroke features
Basic Pen Stroke Features

| | |
|---|---|
| Median FBD Stroke Length | Median length of FBD strokes in the problem solution. |
| Median Equation Stroke Length | Median length of equation strokes in the problem solution. |
| Median Cross-Out Stroke Length | Median length of cross-out strokes in the problem solution. |
| Num FBD Strokes | The total number of FBD strokes in the problem solution. |
| Num Equation Strokes | The total number of equation strokes in the problem solution. |
| Num Cross-Out Strokes | The total number of cross-out strokes in the problem solution. |

Selection of Feature Parameter Values

The system 100 and 200 used a simple optimization process to select parameter values for seven of the features. The parameters for related features were optimized simultaneously.

Table 6 lists the sets: of related features. The optimization process used search to select parameter values that maximized the predictive ability of ordinary least squares regression models.

To begin the search, the system 100 and 200 enumerated a small set of parameter values to explore. The system 100 and 200 used the features to select a reasonable default parameter value. The system 100 and 200 then enumerated smaller values by successively dividing the default value by two, and larger values by successively multiplying by two. This resulted in six values for each parameter. For example, the default value of the parameter "small break lower bound" was 8 seconds. From this, the system 100 and 200 generated values of 1, 2, 4, 8, 16, and 32 seconds. The optimization of a set of related features exhaustively explored all combinations of the enumerated parameter values. For example, the optimization of the break features would nominally explore $6^3=216$ combinations. If the optimum occurred at the boundary of the set of enumerated values, the set was expanded using the above method, and the search repeated.

TABLE 4

Sets of features, the parameters that were chosen to maximize the features' combined predictive ability, and the size of the resulting search spaces (n ~ 6).

| Sets of Features | Parameters (Selected Value) | Search Space Size |
|---|---|---|
| Num Small Breaks | Small break lower bound (2 seconds) | $n^3$ |
| Num Medium Breaks | Boundary between small and medium breaks (40 seconds) | |
| Num Large Breaks | Boundary between medium and large breaks (160 seconds) | |
| Earlier-Neighbor features | Bounding box expansion (0.8 in.) | n |
| Typo-Cross-Outs PS-Cross-Outs | Boundary between typo and PS cross-outs (16 seconds) | n |
| Big-Cross-Outs | Minimum number of strokes crossed-out (10) | n |

Student Performance Prediction Accuracy

Referring now to FIGS. 5, 6, 7 and 8, there is shown graphs 500, 600, 700 and 800 of various student performance predictions. As can be seen, the system 100 and 200 can use the automatically classified pen strokes from homework assignments to predict a student's final exam performance. By analyzing the amount of time that a student spends on homework assignment and identifying students that spend less than a threshold of time or effort working on their homework assignments are likely to perform poorly on the final exam.

Figure 6:
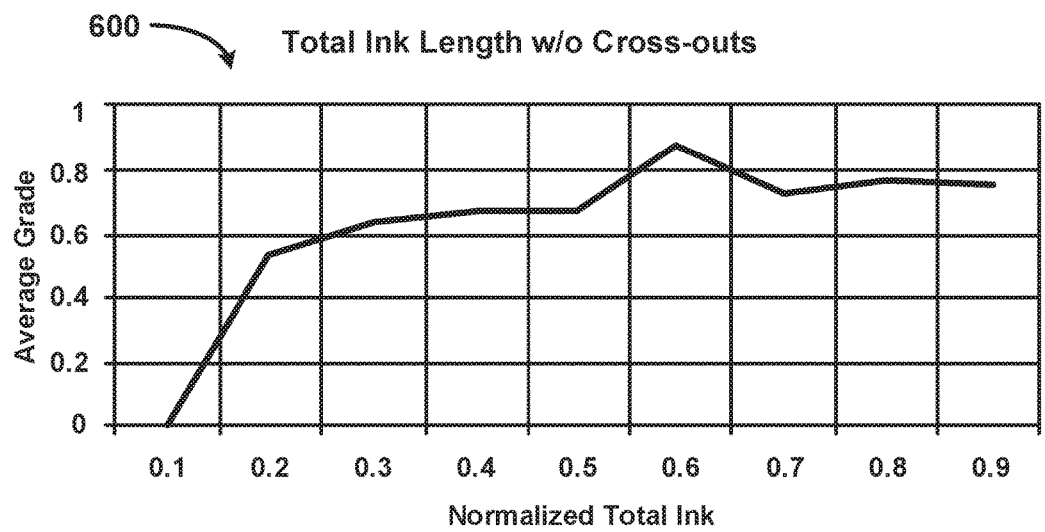
FIG. 6 is a diagram plotting average grade as a function of the normalized total ink length. Cross-out pen stokes are disregarded.
Figure 7:
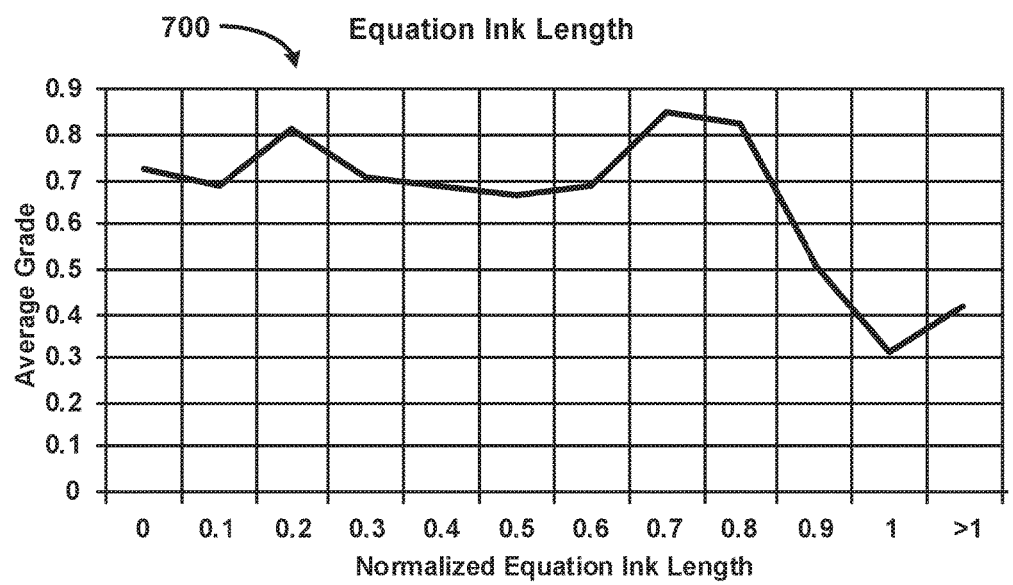
FIG. 7 is a diagram plotting average grade as a function of normalized equation ink length (t-statistic). Cross-out pen strokes are disregarded.
Figure 8:
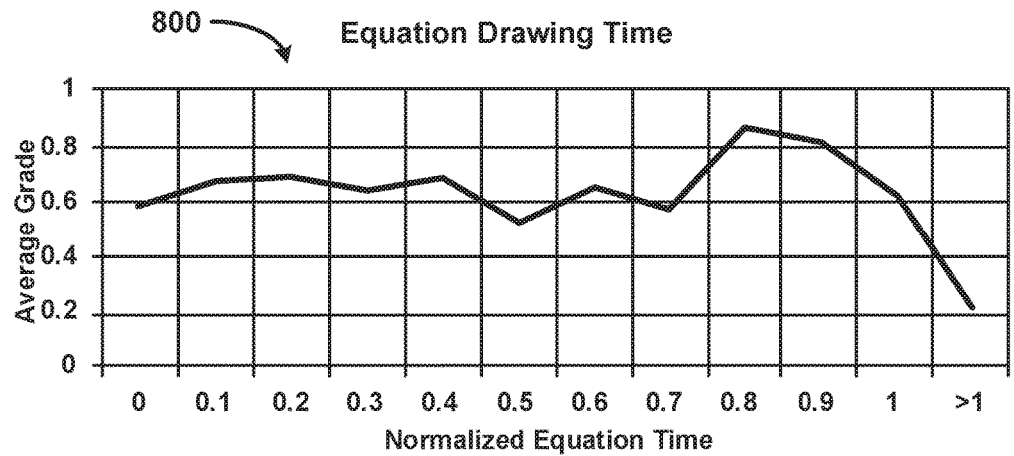
FIG. 8 is a diagram plotting average grade as a function of normalized drawing time (t-statistic). Cross-out pen strokes are disregarded.

The thresholds are based on the total amount of ink drawn 500 and 600 in an assignment that is measured by summing the path length of every pen stroke within the assignment. This value is then normalized by the largest amount of ink found in any single assignment. Students are then grouped according to the normalized ink total. The groupings can comprise students whose normalized ink length is less than 10%, students between 10% and 20%, and so forth. This analysis is repeated disregarding strokes that had been crossed out. FIG. 6 shows those results demonstrating that students who wrote the least on homework do perform worst.

This first analysis only reviews the total amount of ink drawn 500 and 600 and does not consider the semantic content of the ink. In a second analysis, the fraction of ink used for equations 700 and 800 is examined. The ink fraction is normalized using the mean and standard deviation computed across all students, producing a t-statistic. The average final exam grade of students is plotted as a function of the normalized ink length 700 and 800 presents a similar analysis using equation time rather than the amount of ink. A student with a normalized equation ink length or equation time greater than 0.9 (i.e., 0.9 standard deviations greater than the mean) is likely to perform poorly on the final exam 700 and 800.

Using the system 100 and 200 instructors can automatically identify students who may need additional support by only using the students' writing style as a reliable indicator of their performance. The system 100 and 200 can also conduct automatic analysis of students' digital coursework, thereby increasing the prediction of success or failure.

What has been presented is a system using an automatic stroke labeling module. The system 100 and 200 uses domain specific heuristics and machine learning modules comprising four steps: recognizing 402 arrows, boxes, and mathematical symbols; classifying 404 single strokes into one of three semantic classes; grouping classified strokes 406; and finally, correcting contextual errors 408 within groups resulting in a semantic class label for every stroke in a handwritten solution.

The system 100 and 200 can be used for large-scale, real-time educational informatics software, by providing automatic identification of students who might be struggling with their coursework and predicting whether or not a student would perform poorly on the final exam.

The system 100 and 200 has important implications for future educational systems. The automatic classification system described herein can monitor the amount of effort students spend on various solution activities. Using this data, the system can determine which students may be at risk of performing badly on the final exam, for example. This will in turn enable the system 100 and 200 to send targeted instructional materials to struggling students. Additionally, the system 100 and 200 can help an instructor to adapt lecture materials based on the classes' needs.

What has been described is a new and improved system and method for using smartpens as a tool for automatically assessing student learning that is simple and accurate, overcoming the limitations and disadvantages inherent in the related art.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

What is claimed is:

1. A computer assisted method for using smartpen outputs from a student for automatically assessing the student's learning performance, comprising:
   monitoring a smartpen output associated with the student to create a raw activity history for that student;
   characterizing spatial and temporal organization of the raw activity history for that student to thereby create a characterized solution history for that student; and
   analyzing the characterized solution history of the student to thereby assess the student's learning progress,
   wherein the student's smartpen output is time stamped and the characterized solution history associated with the student includes identification of any smartpen output that was subsequently modified or erased by that student.

2. The method of claim 1, wherein the characterized solution history associated with the student comprises a plurality of discrete activities including drawing diagrams, revising diagrams, writing equations, revising equations, work on other problems, and no activity.

3. The method of claim 2, wherein the characterized solution history of the student includes
   a) recognized shapes of common symbols and letters;
   b) classification of pen strokes; and
   c) grouping of pen strokes based on the distance and elapsed time between the strokes.

4. The method of claim 1, wherein the temporal organization of the raw activity history is characterized at least in part by one or more of diagrams, free body diagram effort, equation effort, entropy, complexity, and breaks.

5. The method of claim 1, wherein the spatial organization of the raw activity history is characterized at least in part by out-of-order strokes and earlier-neighbor strokes.

6. The method of claim 1, wherein the characterized solution history includes groupings of solution elements into spatial clusters.

7. The method of claim 6, wherein the spatial and temporal organizations of the characterized solution history are computed and described by solution features computed from the spatial clusters.

8. The method of claim 7, wherein the solution features computed from the spatial clusters include the number of diagrams, free body diagram clusters, free body diagram revisits, free body diagram revisit strokes, number of equation clusters, equation area fractions, equation revisits, equation revisit strokes, or any combination thereof.

9. The method of claim 7, wherein the solution features computed from the spatial clusters include free body diagram strokes crossed-out, equation strokes crossed-out, big-cross-outs, typo-cross-outs, and ps-cross-outs.

10. The method of claim 1, wherein the characterized solution history includes time spent writing by the student, median free body diagram stroke length, median equation stroke length, median cross-out stroke length, number of free body diagram strokes, number of equation strokes, and number of cross-out strokes.

11. The method of claim 1, wherein a probability of correctness of the student's solution to a problem is calculated from features in the characterized solution history.

12. The method of claim 1, wherein a probability of student performance in a course is calculated from features in the characterized solution history.

13. The method of claim 1, wherein a student at risk of poor performance in a course is detected based on their characterized solution history.

14. The method of claim 1, further comprising the steps of:
   a) recognizing letters, mathematical symbols, arrows, and boxes;
   b) classifying single strokes into one of at least three semantic classes;
   c) grouping classified strokes; and
   d) correcting errors within each group.

15. The method of claim 1, further comprising the step of semantically classifying strokes using an automatic character recognition process selected from the group consisting of an image-based recognizer, a domain-specific recognizer, and a single-character recognizer.

16. The method of claim 1, wherein a student at risk of poor performance in a course is detected based on comparing the student's characterized solution history to one or more other student's characterized solution histories.

* * * * *

UNITED STATES PATENT AND TRADEMARK OFFICE
CERTIFICATE OF CORRECTION

PATENT NO. : 10,269,258 B2
APPLICATION NO. : 14/280345
DATED : April 23, 2019
INVENTOR(S) : Thomas Stahovich et al.

It is certified that error appears in the above-identified patent and that said Letters Patent is hereby corrected as shown below:

In the Specification

Figure 13:
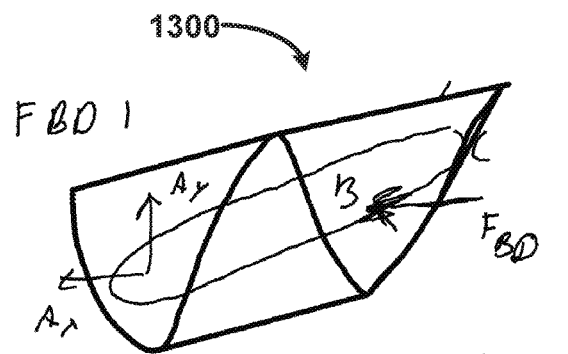
FIG. 13 is a diagram of convex hulls used to identify strokes deleted by cross-outs.
Figure 13:
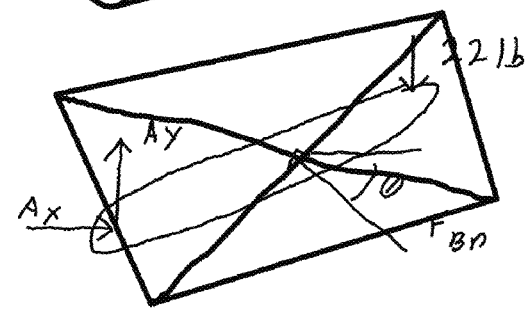

Column 17, Line 38, before "shows the convex hulls of a zigzag-shaped cross-out" insert
--Figure 13--.

Signed and Sealed this
Eighth Day of October, 2019

Andrei Iancu
*Director of the United States Patent and Trademark Office*